United States Patent [19]

Kipling

[11] Patent Number: 4,682,621

[45] Date of Patent: Jul. 28, 1987

[54] MODULATOR VALVE

[75] Inventor: Graham V. Kipling, Agincourt, Canada

[73] Assignee: Diesel Equipment Limited, Toronto, Canada

[21] Appl. No.: 936,942

[22] Filed: Dec. 1, 1986

Related U.S. Application Data

[63] Continuation of Ser. No. 748,442, Jun. 25, 1985, abandoned.

[51] Int. Cl.[4] .......................................... G05D 16/10
[52] U.S. Cl. ................................ 137/116.3; 137/508; 137/627.5
[58] Field of Search ................. 137/116.3, 116.5, 508, 137/627.5

[56] References Cited

U.S. PATENT DOCUMENTS

| | | | |
|---|---|---|---|
| 3,204,972 | 9/1965 | Alfieri | 137/627.5 X |
| 3,485,259 | 12/1969 | Ulbing | 137/116.3 |
| 4,240,464 | 12/1980 | Schink | 137/116.5 X |
| 4,293,118 | 10/1981 | Olson | 137/627.5 X |
| 4,526,197 | 7/1985 | Martin | 137/596.2 |

FOREIGN PATENT DOCUMENTS 748365  7/1980  U.S.S.R. ........................... 137/116.3

Primary Examiner—Robert G. Nilson
Attorney, Agent, or Firm—Fetherstonhaugh & Co.

[57] ABSTRACT

A modulator valve has a modulator member which is slidably mounted in a cylinder and through which an air flow passage extends. A valve member is slidably mounted in the air flow passage and is operable to open and close the through passage. By providing a resilient actuator for displacing the modulator member in a first direction and a stop for arresting the movement of the flow control valve while permitting movement of the modulator valve it is possible to provide for modulated opening and closing of the control valve by balancing the pressure applied by the resilient actuator against the air pressure applied to the modulator member downstream of the through passage.

1 Claim, 3 Drawing Figures

MODULATOR VALVE

This application is a continuation, of application Ser. No. 748,442, filed 06/25/85, now abandoned.

This invention relates to modulator valves. In particular, this invention relates to a pneumatic modulator valve.

PRIOR ART

Considerable difficulty has been experienced in attempting to provide an inexpensive pneumatic modulator valve which can be used to modulate the air flow in a pneumatic system.

In dump trucks, it is necessary to control the rate at which the hydraulic ram is allowed to contract to lower the container body under conditions where the load in the container body may vary considerably. Various attempts have been made to achieve this controlled lowering by using a pneumatic control system for controlling the operation of the hydraulic supply control valves, however, difficulty has been experienced in providing an effective pneumatic modulator valve for this purpose.

I have found that these difficulties can be overcome by providing in a pneumatic valve, the improvement of a modulator member which is slidably mounted in a cylinder and through which the air flow passage extends and in which a valve member is slidably mounted so as to be operable to open and close the through passage. By providing a resilient actuator for displacing the modulator in a first direction and stop means for arresting the movement of the flow control valve while permitting movement of the modulator valve it is possible to provide for modulated opening and closing of the control valve by balancing the pressure applied by the resilient actuator against the air pressure applied to the modulator member downstream of the through passage.

According to one aspect of the present invention, there is provided a pneumatic modulator valve comprising a housing having a cylinder formed therein which has first and second ends, a modulator member slidably mounted in said cylinder for movement to a fro between said ends of said cylinder, said modulator member cooperating with said housing to form a discharge chamber at said second end of said cylinder, resilient actuator means operable to apply a pressure to said modulator member to urge it to move in a direction from said first end toward said second end of said cylinder, an air input passage opening into said housing and through said modulator member into said discharge chamber, a valve member carried by said modulator member for movement relative to said housing and mounted for movement relative to said modulator member between a position closing and a position opening said air input passage, valve closure means normally urging said valve member to its closed position, means for arresting the movement of said valve member with respect to said housing while permitting movement of said modulator member so as to cause said valve member to move to its open position, said modulator member being movable toward said first end of said cylinder when the pressure applied to said modulator member in said discharge chamber exceeds the pressure applied by the resilient actuator to move said valve member toward its closed position.

The invention will be more clearly understood after reference to the following detailed specficiation read in conjunction with the drawings wherein.

Figure 1:
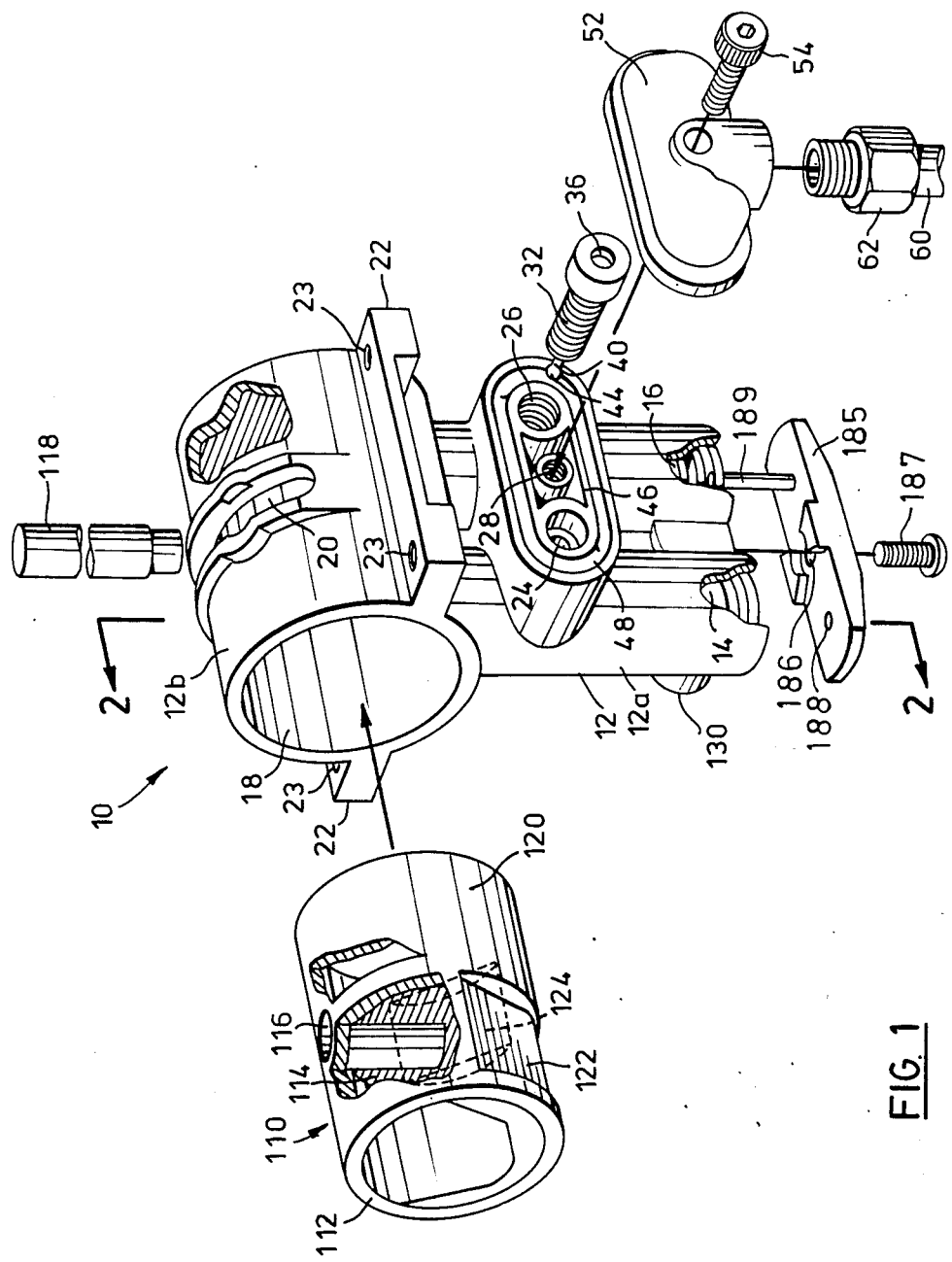
FIG. 1 is a partially exploded pictorial view of a pneumatic valve constructed in accordance with an embodiment of the present invention.
Figure 3:
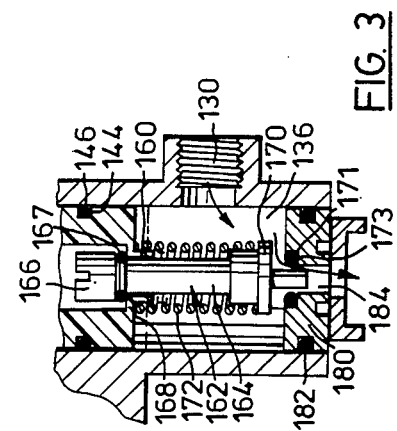
FIG. 3 is a view similar to FIG. 2 showing the valve in an open position.

With reference to FIG. 1 of the drawings the reference numberal 10 refers generally to a pneumatic valve constructed in accordance with an embodiment of the present invention for use in controlling the flow of a stream of air.

The valve 10 comprises housing 12 which has a lower body portion 12a in which cylinders 14 and 16 are formed and an upper portion 12b in which a passage 18 is formed. A slot 20 opens from the passage 18 and extends in an arcuate path through an angle of about 120°. A flange 22 projects laterally from the upper body portion 12b and is formed with threaded mounting passages 23 which may be used for mounting the valve at any required location. A pair of air inlet passages 24 and 26 open into the cylinders 14 and 16 respectively. The air inlet passages 24 and 26 each have an upstream end remote from their associated cylinders 14 and 16 and a downstream end opening into the cylinders 14 and 16 respectively. The inlet passage 26 has a threaded bore. A threaded passage 28 is formed in the lower body portion 12a and is located centrally between the passages 24 and 26. A valve mounting sleeve 32 has a threaded body portion adapted to threadedly engage the threaded bore of the air inlet passage 26. The sleeve 32 has a through passage 36. A Shrader valve 40 is threadedly mounted in the through passage 36 and serves to control the flow of air through the passsage 36. The outer end portion 44 of the Shrader valve 40 bears against a slide member (not shown) which is slidably mounted in the cylinder 16. This mechanism operates in the same manner as that described in application Ser. No. 569,654, now U.S. Pat. No. 4,526,197, which is assigned to the assignee of the present application and will not therefore be described in detail.

Figure 2:
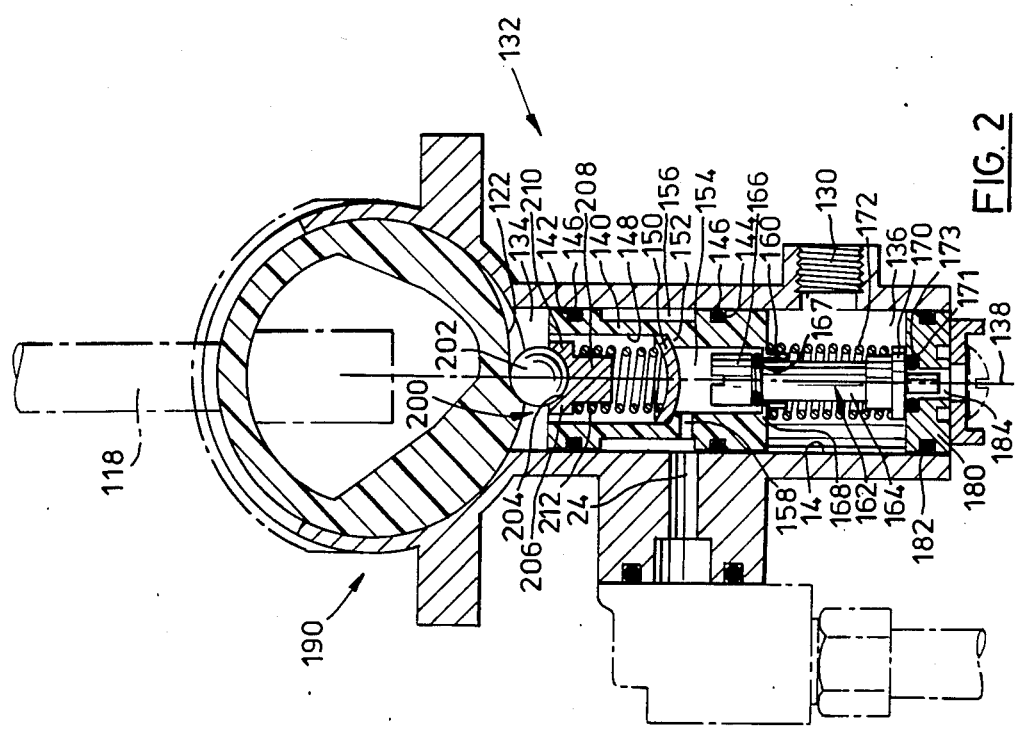
FIG. 2 is a sectional view taken along the line 2—2 of FIG. 1.

The valve actuator includes an actuator drum 110 which comprises a cylindrical body portion 112 within which a boss 114 is formed. A passage 116 opens outwardly from the boss 114 and a manually engageable lever arm 118 is mounted in the passage 116 and arranged to extend through the arcuate slot 20. The cylindrical body portion 112 has a cylindrical outer face 120 which is adapted to fit in a close fitting sliding relationship within the passage 18. The drum 110 is rotatable within the passage 18 by manually engaging the lever arm 18 and moving it angularly along the slot 20. The cylindrical face 120 is formed with cam faces 112 and 124. The cam face 112 is arranged to be disposed in alignment with the open upper end of the cylinder 14 and the cam face 112 is arranged to be located in alignment with the open upper end of the cylinder 16. The contour of the cam face 112 is illustrated in FIG. 2 of the drawings.

The structure of the lower body portion 12a in which the cylinder 14 is formed is different from that previously described in U.S. Pat. No. 4,526,197 issued July 2, 1985 to Diesel Equipment Limited, in that the inlet passage 24a is not threaded and an air outlet passage 130 opens laterally outwardly from the cylinder 14.

As in application Ser. No. 569,654, now U.S. Pat. No. 4,526,197, the air inlet passages 24 and 26 open into the cylinders 14 and 16 respectively through a side face 46. A shallow groove 48 is formed in the side face 46 to receive a sealing ring (not shown). A manifold 52 is secured in a face-to-face relationship with respect to the side face 46 by means of a mounting screw 54 which threadedly engages the threaded passage 28. An air inlet conduit 60 is secured to the manifold by means of a coupling 62.

As previously indicated, the structure of the piston which is mounted in the cylinder 16 is the same as that previously described in application Ser. No. 569,654, now U.S. Pat. No. 4,526,197, and will not therefore be described.

With reference to FIG. 2 of the drawings, it will be seen that the penumatic modulator valve generally identified by the reference numeral 132 includes the cylinder 14 which has a first end 134 and a second end 136. The cylinder 14 has a longitudinal axis 138. The air inlet passage 24 opens into the first end 134 of the cylinder 14 and is located to communicate with the annular recess 156 of the modulator member 140 and the air outlet passage 130 opens from the second end 136. The modulator member 140 is slidably mounted in the cylinder 14 for longitudinal movement in the direction of the axis 138. The modulator member 140 is preferably circular in cross-section as is the cylinder 14. The modulator member 140 has grooves 142 and 144 located at opposite ends thereof within which sealing rings 146 are located which serve to prevent the passage of air between the sides of the modulator member and the wall of the cylinder 14. A bore 148 is formed in the modulator member 140 and extends inwardly from the upper end thereof. A metal divider wall 150 is secured in the bore 148 against a shoulder 152. The metal divider 150 may be in the form of a core plug. The divider wall 150 serves to form a modulator chamber 154 in the lower end of the bore 148. An annular recess 156 is formed about the body of the modulator member 140 and an air input passage 158 is formed in the body of the modulator member and communicates with the annular recess 156 so as to permit air from the air inlet passage 124 to pass to the modulator chamber 154. A modulator output passage 160 is formed in the bottom wall 168 of the modulator member and serves to communicate between the modulator chamber 154 and the second end 136 of the cylinder. A valve member 162 consists of a valve stem 164 which is slidably mounted in the modulator output passage 160. A first valve closure head 166 is mounted on the upper end of the stem 164 and located in the modulator chamber 154. A sealing ring 167 is located on the stem 164 on the underside of the head 166 and serves to sealingly close the modulator output passage 160 when the valve member is located in its closed position. A second valve closure member 170 is located at the distal end of the stem 164 and a compression spring 172 extends between the second valve member 170 and the underside of the bottom wall 168 of the modulator member and normally urges the second valve closure member 170 away from the modulator member, thus tending to locate the first valve closure member 166 in a position closing the modulator passage 160.

A plug 180 is located in the lower end of the cylinder 14 and is sealed therein by means of sealing rings 182. A vent passage 184 opens through the plug 180 and is axially aligned with the second valve closure member 170. An O-ring 171 is located in a recess 173 which is formed in the plug 180 and serves to sealingly engage the second valve closure member 170 to close the vent passage 184 when requird in use. When the vent passage 184 is closed, the second end 136 of the cylinder 14 serves to form a pressure chamber in which the pressure in the air line which communicates with the output passage 130 will be established.

A bridge member 185 is formed with a mounting passage 186 through which a mounting screw 187 extends to communicate with a threaded passage (not shown) formed in the lower face of the housing 12. A stop pin 189 is mounted on the bridge member 185 and extends into the cylinder 16 and a passage 188 is formed in alignment with the lower end portion of the stem 164.

The valve control mechanism generally identified by the reference numeral 190 includes the actuator 110 previously described together with a resiliently compressible valve actuator assembly 200 which includes a ball 202 mounted for movement along the cam 122. The ball 202 is mounted in a dish-shaped recess 204 which is formed in a support 206. The support 206 has a stem portion 208 and an annular shoulder 210. A compression spring 212 extends into the bore 148 and bears against the divider wall 150. The compression spring 212 is proportioned so as to be partially compressed during all positions of the modulator member in use so as to continuously apply a load to the modulator member.

In use, when the lever arm 118 is located in the valve closing position illustrated in FIG. 2 of the drawings, the modulator member 140 is located in a position such that the modulator passage 160 is closed and the vent passage 184 is closed. The loads in the springs 172 and 212 are such that the valve stem 162 is fully extended.

When the lever arm 118 is moved in the direction to effect an opening of the valve, the cam 122 will deflect the ball 202 to apply a compressive load to the compression spring 212. This load will move the modulator member 140 toward the second end of the cylinder 14. The plug 180 prevents movement of the second valve closure 170 with the result that the modulator member 150 moved relative to the valve closure member 166 to open the modulator passage 160. Air is then free to pass from the inlet passage 24 through the passage 158 and modulator chamber 154 through the modulator passage 160 into the second end of the cylinder 16 and outwardly through the output passage 130. The air flow rate can be controlled by moving the lever arm 118 to increase or decrease the load applied to increase or decrease the clearance between the valve closure member 116 and the bottom wall 168 of the modulator member. When the air pressure in the pressure chamber 136 increases, it will act against the distal end of the modulator member 140 and will deflect the modulator member 140 toward the first end of the cylinder by compressing the spring 212 to maintain a pressure balance. This will cause the modulator passage 160 to be restricted automatically so as to automatically maintain the pressure balance and thereby maintain a substantially constant pressure downstream of the modulator member. The downstream pressure can be varied by adjusting the position of the lever arm 118.

When the lever arm 118 is returned to the closed position, the load applied to the modulator member by the spring 212 will be reduced and if the pressure in the pressure chamber 136 is maintained, this pressure will serve to move the modulator member 140 toward the first end of the cylinder until the vent closure member 170 is moved away from the vent passage 184 to open the vent passage 184 to vent the air from the pressure chamber 136 until the pressure drops to a sufficient extent to permit the compression spring 212 to reassert itself and relocate the second valve closure member 170 in a position closing the vent passage 184 such that when the lever arm 118 is again moved to an open position, the valve would operate as previously described.

An important feature of the present invention is the fact that the structure of the valve is simple and inexpensive to manufacture. These and other advantages of the present invention will be apparent to those skilled in the art.

I claim:
1. A pneumatic modulator valve comprising:
   (a) a housing having a cylinder formed therein, said cylinder having first and second ends and a longitudinal axis extending therebetween,
   (b) an air inlet passage opening into said first end of said cylinder and an air outlet passage opening from said second end of said cylinder,
   (c) a modulator member slidably mounted in said cylinder for axial movement along said cylinder between a valve closing position and a valve opening position, said modulator member having a bore extending longitudinally thereof, a plug mounted in said bore and dividing it into a recess which opens toward said first end of said cylinder and a modulator chamber disposed toward said second end of said cylinder said modulator chamber having a modulator output passage opening into said second end of said cylinder.
   (d) an air input passage formed in said modulator member and communicating between said air inlet passage of said housing and said modulator chamber,
   (e) a valve member slidably mounted on said modulator member for movement in the direction of the longitudinal axis of said cylinder between an extended position and a retracted position, said valve member having a proximal end and a distal end, said valve member having a valve closure head located in said modulator chamber for closing said output passage of said modulator when said valve member is in said extended position and to open said output passage of said modulator when said stem is moved towards its retracted position relative to said modulator member,
   (f) a first biasing spring located externally of said modulator chamber and arranged to bear against said valve member and said modulator member to urge said valve member toward its extended position with respect to said modulator member,
   (g) valve arresting means retained at said second end of said cylinder against movement with respect to said cylinder for arresting the movement of said valve member while permitting continued movement of said modulator member towards said second end of said cylinder thereby to open said modulator passage to permit air to flow through said valve,
   (k) modulator means in said housing for movement between a valve closing position and a valve opening position, said modulator control means comprising an actuator cam member mounted for rotation about an axis extending at right angles to said longitudinal axis, a second compression spring mounted in said recess of said modulator member and having one end bearing against said plug, a support member mounted at the other end of said second compression spring, a contact member seated on said support member and bearing against said cam,
   (l) a manually engageable lever mounted on said actuator cams for use in moving said cam to cause it to displace the modulator member toward said second end of said cylinder to an extent sufficient to move the modulator member relative to the valve member after the movement of the valve member has been arrested by the arresting means until the first valve closure member is spaced from the modulator member to open said modulator output passage, said modulator member being free to reciprocate to and fro in said cylinder to balance the pressure in said second end of said cylinder with respect to the load applied by said first biasing means to modulate the air flow through said valve.

* * * * *